(12) United States Patent
Tsukagoshi

(10) Patent No.: US 10,743,005 B2
(45) Date of Patent: Aug. 11, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 571 days.

(21) Appl. No.: 15/318,597

(22) PCT Filed: Jul. 9, 2015

(86) PCT No.: PCT/JP2015/069786
§ 371 (c)(1),
(2) Date: Dec. 13, 2016

(87) PCT Pub. No.: WO2016/017397
PCT Pub. Date: Feb. 4, 2016

(65) Prior Publication Data
US 2017/0111644 A1 Apr. 20, 2017

(30) Foreign Application Priority Data

Jul. 31, 2014 (JP) .................................. 2014-156995

(51) Int. Cl.
*H04N 19/30* (2014.01)
*H04N 21/236* (2011.01)
(Continued)

(52) U.S. Cl.
CPC .............. *H04N 19/30* (2014.11); *H04N 19/50* (2014.11); *H04N 19/70* (2014.11);
(Continued)

(58) Field of Classification Search
CPC ........ H04N 19/30; H04N 19/50; H04N 19/70; H04N 21/234327; H04N 21/23439;
(Continued)

(56) References Cited

U.S. PATENT DOCUMENTS 9,787,979 B2 * 10/2017 Boyce ..................... H04N 19/70
2013/0223529 A1 * 8/2013 Amonou .............. H04N 19/105
375/240.12
(Continued)

FOREIGN PATENT DOCUMENTS

JP 2008-543142 A 11/2008
WO 2013/151814 A1 10/2013

OTHER PUBLICATIONS

Karsten Grüneberg, Thomas Schierl, Ying Chen, Hendry, Sam Narasinnhan, Text of ISO/IEC 13818-1:2013 / PDAM 7—Carriage of Layered HEVC, ISO/IEC JTC1/SC29/WG11 MPEG108/w1.4319 (Year: 2014).*

(Continued)

*Primary Examiner* — William C Vaughn, Jr.
*Assistant Examiner* — Naod W Belai
(74) *Attorney, Agent, or Firm* — Oblon, McClelland, Maier & Neustadt, L.L.P.

(57) ABSTRACT

Basic format image data and the predetermined number of pieces of high-quality format image data are successfully transmitted.

A basic video stream obtained by encoding basic format image data and a predetermined number of extended video streams obtained by encoding the predetermined number of pieces of high-quality format image data are generated. A container in a predetermined format including each of the video streams is transmitted. Identification information in a high-quality format corresponding to each of the predetermined number of extended video streams is inserted into a layer of the container and/or the video stream.

12 Claims, 12 Drawing Sheets

Semantics of Scalable extension descriptor

```
type of enhancement (4bits)      SHOWS EXTENDED CATEGORY OF STREAM
        0x1    SPATIAL SCALABLE EXTENSION
        0x2    FRAME RATE SCALABLE EXTENSION
        0x3    DYNAMIC RANGE SCALABLE EXTENSION
        0x4    COLOR GAMUT SCALABLE EXTENSION
        0x5    BIT LENGTH SCALABLE EXTENSION
        0x6    SPATIAL/FRAME RATE SCALABLE EXTENSION
        0x7    FRAME RATE/DYNAMIC RANGE SCALABLE EXTENSION
                     :
                     :
scalable_priority (4bits)  SHOWS PRIORITY IN SAME EXTENDED CATEGORY
        0x0    FIRST PRIORITY (REFERRING TO BASIC STREAM)
        0x1    SECOND PRIORITY (REFERRING TO FIRST PRIORITY STREAM)

enhancement reference PID (32bits)   SHOWS PID VALUE OF REFERENCE STREAM
```

(51) Int. Cl.
*H04N 19/70* (2014.01)
*H04N 21/2662* (2011.01)
*H04N 21/438* (2011.01)
*H04N 21/4545* (2011.01)
*H04N 19/50* (2014.01)
*H04N 21/2343* (2011.01)
*H04N 21/4402* (2011.01)
*H04N 21/845* (2011.01)
*H04N 21/434* (2011.01)

(52) U.S. Cl.
CPC ....... *H04N 21/236* (2013.01); *H04N 21/2662* (2013.01); *H04N 21/438* (2013.01); *H04N 21/4545* (2013.01); H04N 21/23439 (2013.01); H04N 21/234327 (2013.01); *H04N 21/434* (2013.01); *H04N 21/44029* (2013.01); *H04N 21/440227* (2013.01); *H04N 21/8451* (2013.01)

(58) Field of Classification Search
CPC ............. H04N 21/236; H04N 21/2662; H04N 21/434; H04N 21/438; H04N 21/440227; H04N 21/44029; H04N 21/4545; H04N 21/8451

See application file for complete search history.

(56) References Cited

U.S. PATENT DOCUMENTS

2013/0266077 A1   10/2013  Boyce et al.
2014/0192894 A1*  7/2014   Deshpande ............ H04N 19/70
                                               375/240.25
2015/0110167 A1*  4/2015   Chen ..................... H04N 19/70
                                               375/240.01

OTHER PUBLICATIONS

Sam Narasimhan, et al., "Extensions to support layer addition and removal, access unit structure and changes to HRD model in scalable HEVC", Input Document to JCT-VC-N0048, Joint Collaborative Team on Video Coding (JCT-VC) of ITU-T SG 16 WP 3 and ISO/IEC JTC 1/SC 29/WG 11, Total 3 Pages, 2013.

International Search Report dated Sep. 29, 2015 in PCT/JP2015/069786 Filed Jul. 9, 2015.

* cited by examiner

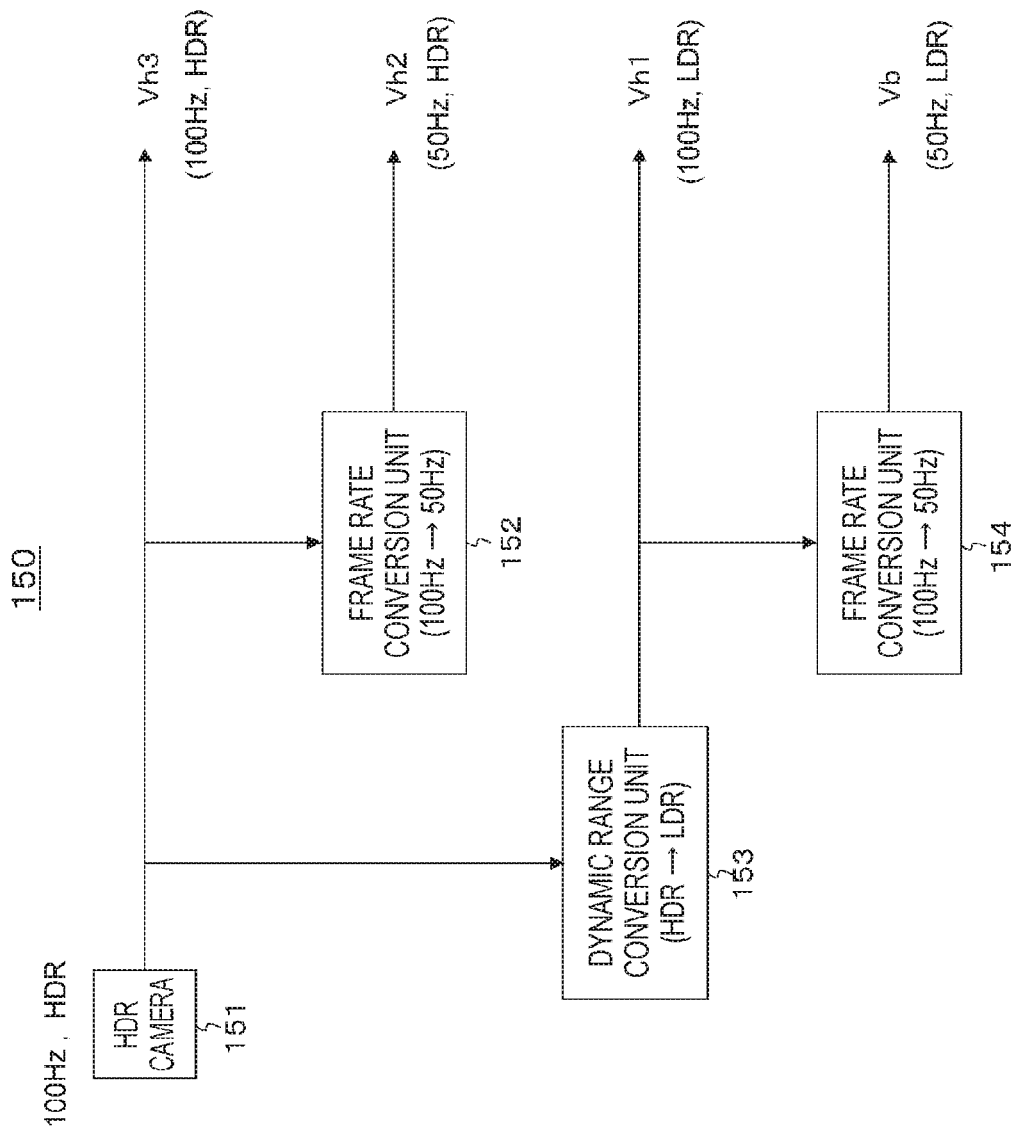

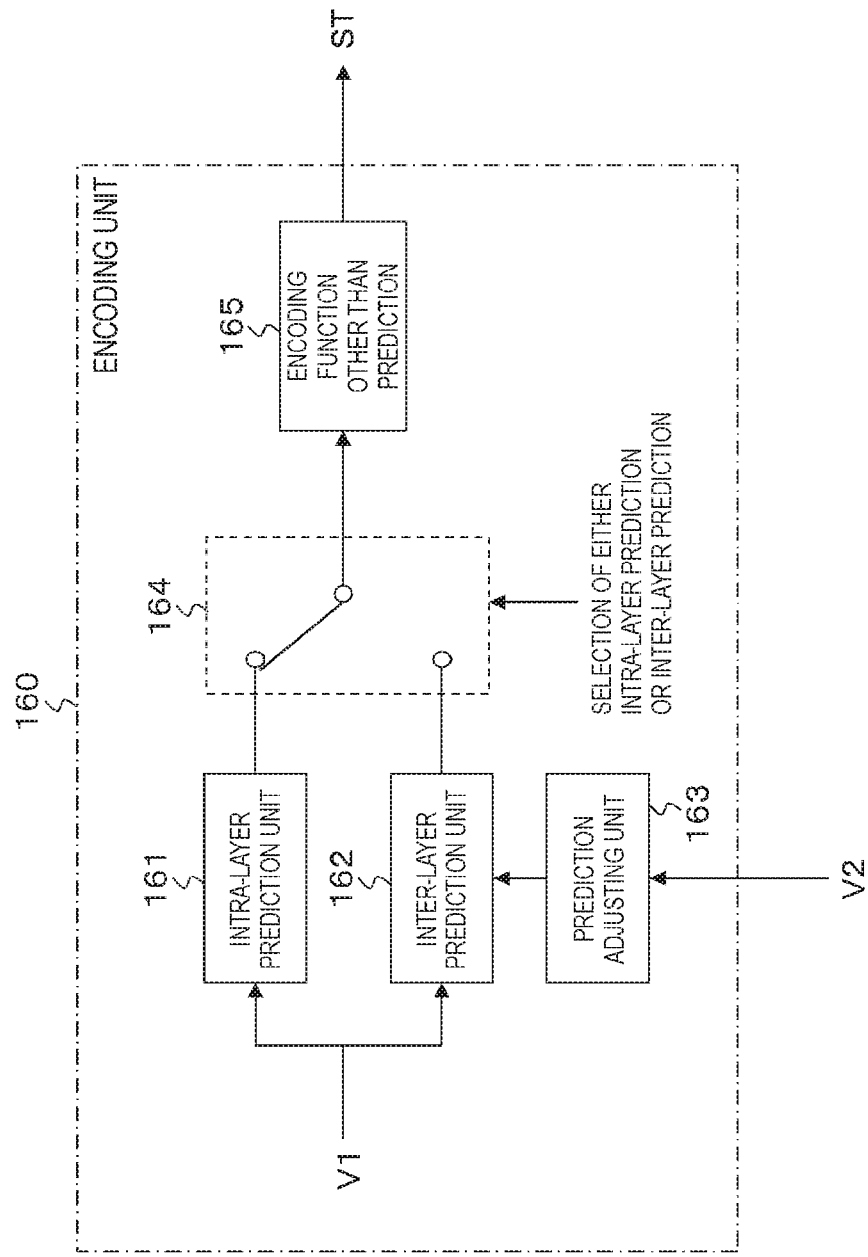

FIG.5

NAL unit header syntax (a)

| Syntax | No. of Bits | Format |
|---|---|---|
| nal_unit_header() { | | |
|   forbidden_zero_bit | 1 | bslbf |
|   nal_unit_type | 6 | uimslbf |
|   nuh_layer_id | 6 | bslbf |
|   nuh_temporal_id_plus1 | 3 | uimslbf |
| } | | |

Semantics

| | | |
|---|---|---|
| Forbidden_zero_bit | (1bit) | REQUIRED TO BE ZERO |
| Nal_unit_type | (6bits) | SHOWS TYPE OF NAL unit |
| Nuh_layer_id | (6bits) | ID SHOWING LAYER EXTENSION TYPE OF STREAM |
| Nuh_temporal_id_plus1 | (3bits) | SHOWS temporal_id VALUE 0 TO 6 |

(b)

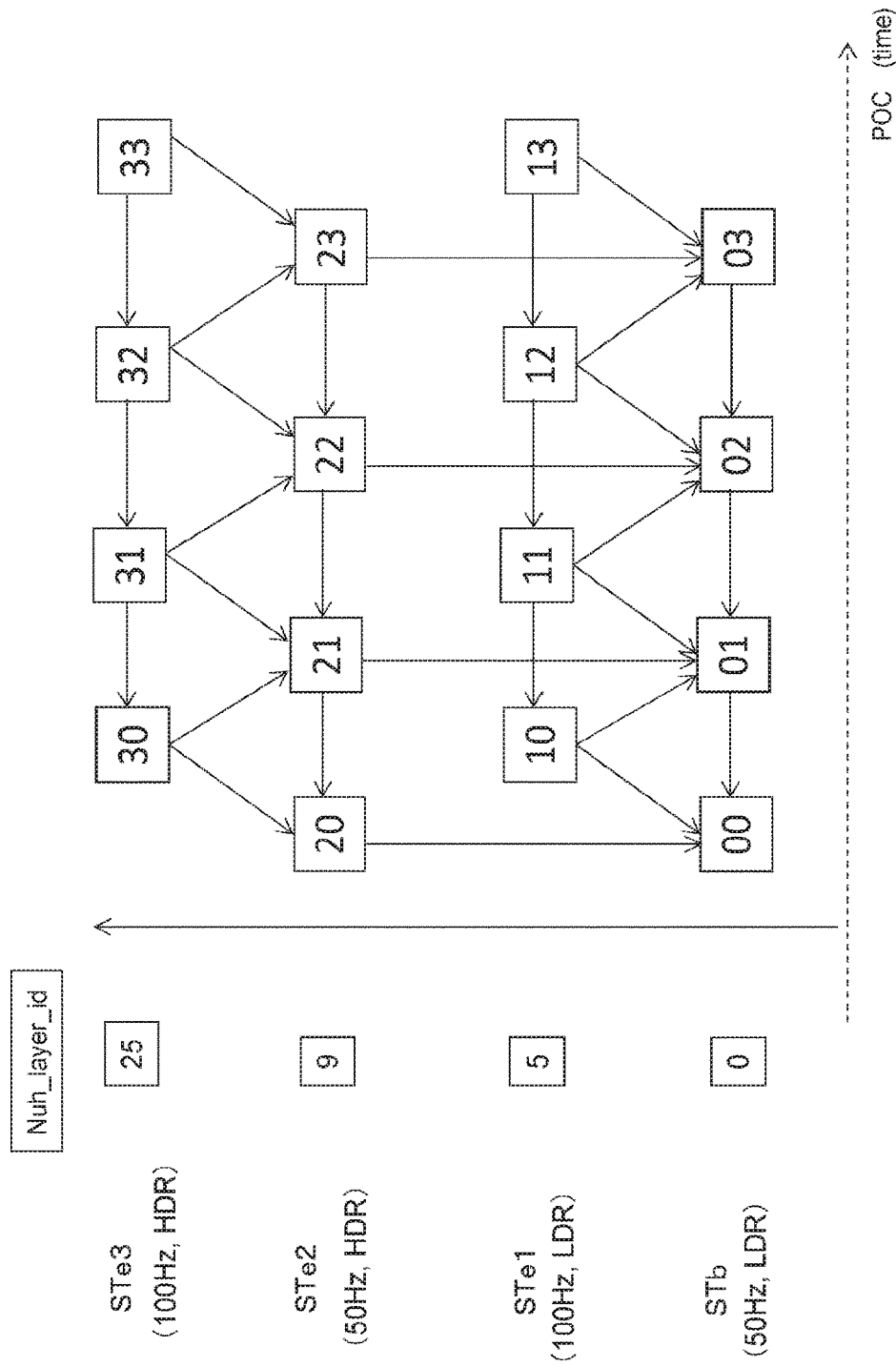

FIG.7

Scalable extension descriptor

| Syntax | No. of Bits | Format |
|---|---|---|
| scalable_extension_descriptor(){ | | |
|     descriptor_tag | 8 | uimsbf |
|     descriptor_length | 8 | uimsbf |
|     type of enhancement | 4 | uimsbf |
|     scalable_priority | 4 | uimsbf |
|     enhancement reference PID | 32 | uimsbf |
| } | | |

FIG.8

Semantics of Scalable extension descriptor type of enhancement (4bits)          SHOWS EXTENDED CATEGORY OF STREAM
 0x1 SPATIAL SCALABLE EXTENSION
 0x2 FRAME RATE SCALABLE EXTENSION
 0x3 DYNAMIC RANGE SCALABLE EXTENSION
 0x4 COLOR GAMUT SCALABLE EXTENSION
 0x5 BIT LENGTH SCALABLE EXTENSION
 0x6 SPATIAL/FRAME RATE SCALABLE EXTENSION
 0x7 FRAME RATE/DYNAMIC RANGE SCALABLE EXTENSION
 ::

scalable_priority (4bits)  SHOWS PRIORITY IN SAME EXTENDED CATEGORY
 0x0 FIRST PRIORITY (REFERRING TO BASIC STREAM)
 0x1 SECOND PRIORITY (REFERRING TO FIRST PRIORITY STREAM)

enhancement reference PID (32bits)   SHOWS PID VALUE OF REFERENCE STREAM

FIG.9

| Nuh_layer_id (0~63) | scalable_extension_descriptor | MEANING |
|---|---|---|
| 0 | | SHOWS BASE stream |
| 1~4 | type of enhancement = 0x1 | SHOWS SPATIALLY EXTENDED stream |
| 5~8 | type of enhancement = 0x2 | SHOWS FRAME RATE EXTENDED stream |
| 9~12 | type of enhancement = 0x3 | SHOWS DYNAMIC RANGE EXTENDED stream |
| 13~16 | type of enhancement = 0x4 | SHOWS COLOR GAMUT EXTENDED stream |
| 17~20 | type of enhancement = 0x5 | SHOWS BIT LENGTH EXTENDED stream |
| 21~24 | type of enhancement = 0x6 | SHOWS SPATIALLY EXTENDED AND FRAME RATE EXTENDED stream |
| 25~28 | type of enhancement = 0x7 | SHOWS FRAME RATE EXTENDED AND DYNAMIC RANGE EXTENDED stream |
| ... | ... | ... |

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly to a transmission device or the like which transmits basic format image data and a predetermined number of pieces of high-quality format image data.

BACKGROUND ART

In the related art, it is known to transmit basic format image data and high-quality format image data, and to selectively use the basic format image data or the high-quality format image data on a receiving side. For example, Patent Document 1 describes that a stream of a base layer for a low-resolution video service and a stream of an extended layer for a high-resolution video service are generated by performing scalable media encoding and broadcast signals including these streams are transmitted. A high-quality format includes a high frame frequency, a high dynamic range, a wide color gamut, a high bit length, and the like in addition to a high resolution.

CITATION LIST

Patent Literature

Patent Literature 1: JP 2008-543142T

SUMMARY OF INVENTION

Technical Problem

An object of the present technology is to successfully transmit basic format image data and a predetermined number of pieces of high-quality format image data.

Solution to Problem

A concept of the present technology is a transmission device including: an image encoding unit which generates a basic video stream obtained by encoding basic format image data and a predetermined number of extended video streams obtained by encoding the predetermined number of pieces of high-quality format image data; a transmission unit which transmits a container in a predetermined format including the basic video stream and the predetermined number of extended video streams generated by the image encoding unit; and an identification information insertion unit which inserts identification information in a high-quality format corresponding to each of the predetermined number of extended video streams into a layer of the container and/or the video stream.

In the present technology, a basic video stream and a predetermined number of extended video streams are generated by an image encoding unit. Here, the basic video stream is obtained by encoding basic format image data. In addition, the predetermined number of extended video streams are obtained by encoding the predetermined number of pieces of high-quality format image data, respectively.

For example, the image encoding unit may generate, with respect to the basic format image data, the basic video stream by performing a prediction encoding process in the basic format image data, and generate, with respect to the high-quality format image data, the extended video stream by selectively performing a prediction encoding process in the high-quality format image data or a prediction encoding process between the high-quality format image data and the basic format image data or between the high-quality format image data and other high-quality format image data.

The transmission unit transmits a container in a predetermined format including the basic video stream and the predetermined number of extended video streams generated by the image encoding unit. The container may be, for example, a transport stream (MPEG-2 TS) that has been employed in digital broadcasting standards. In addition, the container may be, for example, MP4 that has been used in distribution on the Internet and the like, or a container in a format other than that.

An identification information insertion unit inserts identification information in a high-quality format corresponding to each of the predetermined number of extended video streams into a layer of the container or the video stream. For example, when the container is MPEG2-TS and the identification information insertion unit inserts the identification information into the layer of the container, the identification information may be inserted into respective video elementary stream loops (video ES loop) corresponding to the predetermined number of extended video streams present under a program map table (PMT). In addition, for example, a video stream has a network abstraction layer (NAL) unit structure, and the identification information insertion unit may insert the identification information into a header of the NAL unit.

According to the present technology, identification information in a high-quality format corresponding to the predetermined number of extended video streams is inserted into a layer of the container or the video stream and transmitted. Therefore, it is easy to obtain image data in accordance with display capability on a receiving side by selectively performing a decoding process on a predetermined video stream based on the identification information.

In the present technology, for example, the identification information inserted into a layer of the container may include information indicating whether each of the predetermined number of extended video streams is generated by performing a prediction encoding process between the high-quality format image data and the basic format image data or by performing a prediction encoding process between the high-quality format image data and the high-quality format image data. In this case, it is possible to easily check on the receiving side whether basic format image data is referred to or other high-quality format image data are referred to in a prediction encoding process when each of the predetermined number of extended video streams is generated.

In the present technology, for example, the identification information inserted into a layer of the container may include information indicating a video stream corresponding to image data referred to in a prediction encoding process between the high-quality format image data and the basic format image data or between the high-quality format image data and other high-quality format image data performed when each of the predetermined number of extended video streams is generated. In this case, it is possible to easily recognize on the receiving side which video stream corresponds to the image data referred to in the prediction encoding process when each of the predetermined number of extended video streams is generated.

Another concept of the present technology is a reception device including: a reception unit which receives a container in a predetermined format including a basic video stream obtained by encoding basic format image data and a predetermined number of extended video streams obtained by encoding the predetermined number of pieces of high-quality format image data. Identification information in a high-quality format corresponding to each of the predetermined number of extended video streams is inserted into a layer of the container and/or a layer of the video stream, and the reception device further includes a process unit which processes each of the video streams included in the received container based on the identification information.

In the present technology, a reception unit receives a container including a basic video stream and a predetermined number of extended video streams. Here, the basic video stream is obtained by encoding basic format image data. In addition, the predetermined number of extended video streams are obtained by encoding the predetermined number of pieces of high-quality format image data. Identification information in a high-quality format corresponding to each of the predetermined number of extended video streams is inserted into a layer of the container or the video stream.

For example, the basic video stream may be generated by performing, with respect to the basic format image data, a prediction encoding process in the basic format image data, and the extended video stream may be generated by selectively performing, with respect to the high-quality format image data, a prediction encoding process in the high-quality format image data or a prediction encoding process between the high-quality format image data and the basic format image data or between the high-quality format image data and other high-quality format image data.

The process unit processes each of the video streams included in the received container based on the identification information. For example, the process unit may acquire image data in accordance with display capability by performing a decoding process on the basic video stream and a predetermined one of the extended video streams based on the identification information and display capability information.

In this manner, each of the video streams is processed based on identification information in a high-quality format corresponding to each of the predetermined number of extended video streams inserted into a layer of the container or the video stream and transmitted in the present technology. Accordingly, image data in accordance with reception capability is easily obtained by selectively performing a decoding process on a predetermined video stream.

Advantageous Effects of Invention

According to the present technology, it is possible to successfully transmit basic format image data and the predetermined number of pieces of high-quality format image data. It should be noted that the effects described herein are not necessarily limitative, and any effect described in the present disclosure may be exhibited.

BRIEF DESCRIPTION OF DRAWINGS

FIG. 3 is a block diagram showing a configuration example of an image data generation unit which generates a piece of basic format image data Vb and three pieces of high-quality format image data Vh1, Vh2, and Vh3.

FIG. 4 is a block diagram showing a configuration example of a main portion of an encoding unit.

FIG. 5 is a diagram showing a structure example of an NAL unit header and a content of a main parameter in the structure example.

FIG. 6 is a diagram showing a configuration example of a basic video stream STb and extended video streams STe1, STe2, and STe3.

FIG. 7 is a diagram showing a structure example of a scalable extension descriptor.

FIG. 8 is a diagram showing a content of principle information in the structure example of the scalable extension descriptor.

FIG. 9 is a diagram showing a correspondence relationship between a value of "type of enhancement" field of the scalable extension descriptor and a value of "nuh_layer_id" of the NAL unit header.

DESCRIPTION OF EMBODIMENTS

Hereinafter, embodiments for implementing this technology (hereinafter referred to as "embodiments") will be described. Note that description will be provided in the following order.

1. Embodiment
2. Modified example

1. Embodiment

[Transmission and Reception System]

Figure 1:
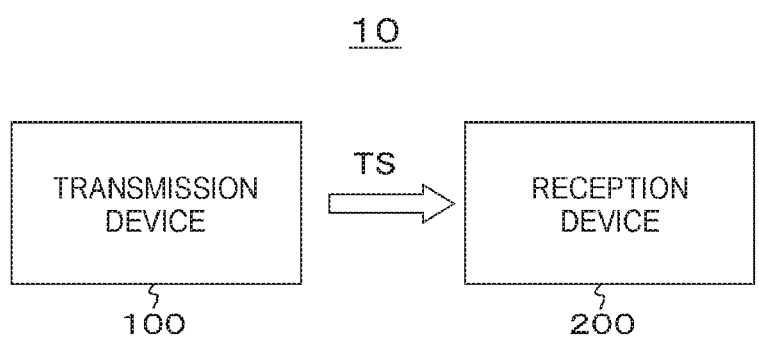
FIG. 1 is a block diagram showing a configuration example of a transmission and reception system of an embodiment.

FIG. 1 shows a configuration example of a transmission and reception system 10 as an embodiment. This transmission and reception system 10 is configured to have a transmission device 100 and a reception device 200.

A transmission device 100 transmits a transport stream TS as a container by placing it on a broadcast wave or a net packet. This transport stream TS includes a basic video stream and a predetermined number of extended video streams.

The basic video stream is generated by performing encoding such as H.264/AVC and H.265/HEVC on basic format image data. Here, with respect to the basic format image data, the basic video stream is generated by performing a prediction encoding process within the basic format image data.

The predetermined number of extended video streams is generated by performing encoding such as H.264/AVC and H.265/HEVC on the predetermined number of pieces of high-quality image data. Here, with respect to the high-quality format image data, an extended video stream is generated by selectively performing a prediction encoding process in the high-quality format image data or a prediction encoding process between the high-quality format image data and the basic format image data or between the high-quality format image data and other high-quality format image data.

Identification information in a high-quality format corresponding to each of the predetermined number of extended video streams is inserted into a layer of the container. The high-quality format corresponding to each of the predetermined number of extended video streams can be easily grasped on a receiving side in the layer of the container based on the identification information. In the embodiment, the identification information is inserted into respective video elementary stream loops corresponding to the predetermined number of extended video streams present under a program map table.

The identification information includes information indicating whether each of the predetermined number of extended video streams is generated by performing a prediction encoding process between the high-quality format image data and basic format image data or by performing a prediction encoding process between the high-quality format image data and high-quality format image data. Using the information, it is possible to easily recognize on the receiving side in the layer of the container whether the basic format image data is referred to or other high-quality format image data is referred to in a prediction encoding process when each of the predetermined number of extended video streams is generated.

In addition, the identification information includes information indicating a video stream corresponding to image data referred to in a prediction encoding process performed between the high-quality format image data and the basic format image data or between the high-quality format image data and other high-quality format image data performed when each of the predetermined number of extended video streams is generated. Using the information, it is possible to easily recognize on the receiving side in the layer of the container which video stream corresponds to the image data referred to in the prediction encoding process when each of the predetermined number of extended video streams is generated.

Identification information in a high-quality format corresponding to each of the predetermined number of extended video streams is inserted into a layer of the video stream. Using the identification information, it is possible to easily grasp a high-quality format corresponding to each of the predetermined number of extended video streams on a receiving side. In the embodiment, the identification information is inserted into a header of an NAL unit.

A reception device 200 receives the transport stream TS placed on a broadcast wave or a net packet and transmitted by the transmission device 100. Identification information in a high-quality format corresponding to each of the predetermined number of extended video streams included in the transport stream TS is inserted into a layer of the container or the video stream as described above. The reception device 200 processes each video stream included in the transport stream TS and acquires image data in accordance with display capability based on the identification information.

[Configuration of Transmission Device]

Figure 2:
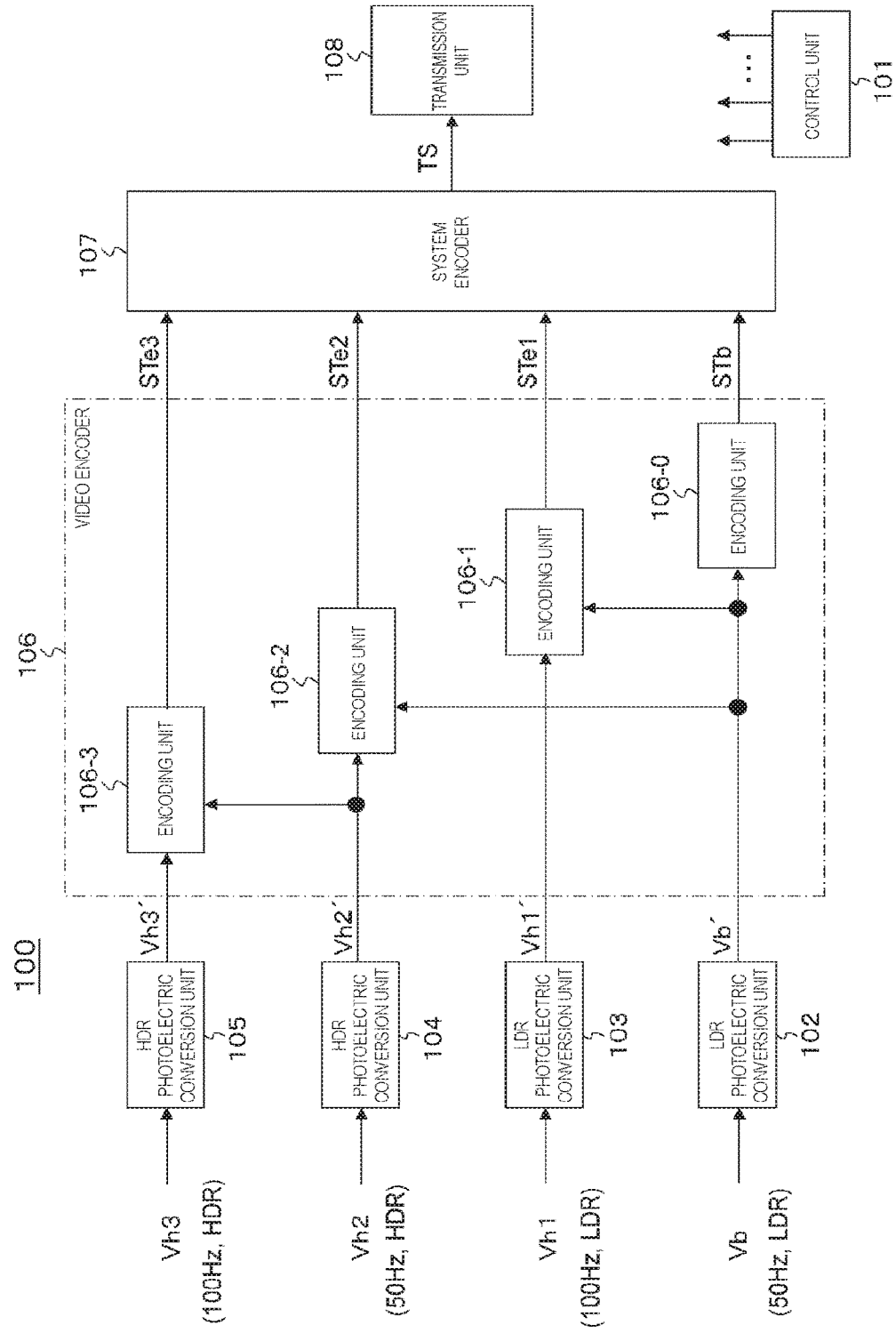
FIG. 2 is a block diagram showing a configuration example of a transmission device.

FIG. 2 shows a configuration example of the transmission device 100. The transmission device 100 deals with a piece of basic format image data Vb and three pieces of high-quality format image data Vh1, Vh2, and Vh3 as transmission image data. Here, the basic format image data Vb is low dynamic range (LDR) image data whose frame frequency is 50 Hz. The high-quality format image data Vh1 is LDR image data whose frame frequency is 100 Hz. The LDR image data has a brightness range from 0% to 100% with respect to luminance of a white peak of an LDR image of the related art.

The high-quality format image data Vh2 is a high dynamic range (HDR) image data whose frame frequency is 50 Hz. The high-quality format image data Vh3 is HDR image data whose frame frequency is 100 Hz. The HDR image data has a brightness range of 0 to 100%*N, for example, 0 to 400% or 0 to 800%, if the luminance of the white peak of the LDR image of the related art is set to 100%.

FIG. 3 shows a configuration example of an image data generation unit 150 which generates the basic format image data Vb and three pieces of high-quality format image data Vh1, Vh2, and Vh3. The image data generation unit 150 includes a HDR camera 151, a frame rate conversion unit 152, a dynamic range conversion unit 153, and a frame rate conversion unit 154.

The HDR camera 151 images a subject and outputs a HDR image data whose frame frequency is 100 Hz, that is, the high-quality format image data Vh3. The frame rate conversion unit 152 performs a process of converting the frame frequency from 100 Hz to 50 Hz on the high-quality format image data Vh3 output by the HDR camera 151, and outputs a HDR image data whose frame frequency is 50 Hz, that is, the high-quality format image data Vh2.

The dynamic range conversion unit 153 performs a process of converting a HDR into a LDR on the high-quality format image data Vh3 output by the HDR camera 151, and outputs a LDR image data whose frame frequency is 100 Hz, that is, the high-quality format image data Vh1. The frame rate conversion unit 154 performs a process of converting the frame frequency from 100 Hz to 50 Hz on the high-quality format image data Vh1 output by the dynamic range conversion unit 153, and outputs an LDR image data whose frame frequency is 50 Hz, that is, the basic format image data Vb.

Returning to FIG. 2, the transmission device 100 includes a control unit 101, LDR photoelectric conversion units 102 and 103, HDR photoelectric conversion units 104 and 105, a video encoder 106, a system encoder 107, and a transmission unit 108. The control unit 101 is configured to include a central processing unit (CPU), and controls operations of each unit of the transmission device 100 based on a control program.

The LDR photoelectric conversion unit 102 obtains basic format image data Vb for transmission by applying photoelectric conversion characteristics (LDR OETF curve) for an LDR image to the basic format image data Vb. The LDR photoelectric conversion unit 103 obtains high-quality format image data Vh1 for transmission by applying the photoelectric conversion characteristics for an LDR image to the high-quality format image data Vh1.

The HDR photoelectric conversion unit 104 obtains a high-quality format image data Vh2 for transmission by applying photoelectric conversion characteristics (HDR OETF curve) for a HDR image to the high-quality format image data Vh2. The HDR photoelectric conversion unit 105 obtains a high-quality format image data Vh3 for transmission by applying the photoelectric conversion characteristics for a HDR image to the high-quality format image data Vh3.

The video encoder 106 includes four encoding units 106-0, 106-1, 106-2, and 106-3. The encoding unit 106-0 performs a prediction encoding process such as H.264/AVC or H.265/HEVC on the basic format image data Vb for transmission, and generates a basic video stream STb. In this case, the encoding unit 106-0 performs prediction within the image data Vb.

The encoding unit 106-1 performs the prediction encoding process such as H.264/AVC or H.265/HEVC on the high-quality format image data Vh1 for transmission, and generates an extended video stream STe1. In this case, the encoding unit 106-1 selectively performs prediction in the image data Vh1 or prediction between the image data Vh1 and the image data Vb for each encoding block to reduce a prediction residue.

The encoding unit 106-2 performs the prediction encoding process such as H.264/AVC or H.265/HEVC on the high-quality format image data Vh2 for transmission, and generates an extended video stream STe2. In this case, the encoding unit 106-2 selectively performs prediction in the image data Vh2 or prediction between the image data Vh2 and the image data Vb for each encoding block to reduce a prediction residue.

The encoding unit 106-3 performs the prediction encoding process such as H.264/AVC or H.265/HEVC on the high-quality format image data Vh3 for transmission, and generates an extended video stream STe3. In this case, the encoding unit 106-3 selectively performs prediction in the image data Vh3 or prediction between the image data Vh3 and the image data Vh2 for each encoding block to reduce a prediction residue.

FIG. 4 shows a configuration example of a main portion of the encoding unit 160. The encoding unit 160 can be applied to the encoding unit 106-1, 106-2, or 106-3. The encoding unit 160 includes an intra-layer prediction unit 161, an inter-layer prediction unit 162, a prediction adjusting unit 163, a selection unit 164, and an encoding function unit 165.

The intra-layer prediction unit 161 obtains, with respect to image data V1 to be encoded, prediction residual data by performing prediction (intra-layer prediction) in the image data V1 to be encoded. The inter-layer prediction unit 162 obtains, with respect to the image data V1 to be encoded, prediction residual data by performing prediction (inter-layer prediction) between the image data V1 and image data V2 to be referred to.

The prediction adjusting unit 163 performs the following processes according to a type of scalable extension of the image data V1 to the image data V2 to efficiently perform inter-layer prediction by the inter-layer prediction unit 162. In a case of dynamic range extension, level adjustment for converting an LDR into a HDR is performed. In a case of spatial scalable extension, a block is enlarged to a predetermined size. In a case of frame rate extension, a process is bypassed. In a case of color gamut extension, mapping is performed on each of brightness and color difference. In a case of bit length extension, a conversion to align MSBs of a pixel is performed.

For example, in a case of the encoding unit 106-1, the image data V1 is a high-quality format image data Vh1' (100 Hz, LDR), the image data V2 is basic format image data Vb' (50 Hz, LDR), and the type of scalable extension is frame rate extension. For this reason, the image data Vb' is bypassed as it is by the prediction adjusting unit 163.

In addition, for example, in a case of the encoding unit 106-2, the image data V1 is a high-quality format image data Vh2' (50 Hz, HDR), the image data V2 is the basic format image data Vb' (50 Hz, LDR), and the type of scalable extension is dynamic range extension. For this reason, the level adjustment for converting an LDR into a HDR is performed on the image data Vb' by the prediction adjusting unit 163.

Moreover, for example, in a case of the encoding unit 106-3, the image data V1 is a high-quality format image data Vh3' (100 Hz, HDR), the image data V2 is the high-quality format image data Vh2' (50 Hz, HDR), and the type of scalable extension is frame rate extension. For this reason, the image data Vb' is bypassed as it is by the prediction adjusting unit 163.

The selection unit 164 selectively takes out either prediction residual data obtained by the intra-layer prediction unit 161 or prediction residual data obtained by the inter-layer prediction unit 162 for each encoding block, and transmits the result to the encoding function unit 165. In this case, the selection unit 164 takes out, for example, a smaller one of these pieces of prediction residual data. The encoding function unit 165 obtains a video stream ST by performing an encoding process such as conversion encoding, quantization, or entropy encoding on the prediction residual data taken out by the selection unit 164.

Returning to FIG. 2, the video encoder 106 inserts identification information of each corresponding high-quality format into layers of the extended video streams STe1, STe2, and STe3. The video encoder 106 inserts identification information into, for example, a header of the NAL unit.

FIG. 5(a) shows a structure example (Syntax) of an NAL unit header, and FIG. 5(b) shows a content (Semantics) of a main parameter in the structure example. A 1-bit field of "Forbidden_zero_bit" is required to be zero. A 6-bit field of "nal_unit_type" shows a type of an NAL unit. A 6-bit field of "Nuh_layer_id" is an ID showing a layer extension type of a stream. A 3-bit field of "nuh_temporal_id_plus1" shows a temporal_id (0 to 6), and takes a value (1 to 7) obtained by adding 1 thereto.

In the embodiment, the 6-bit field of "nuh_layer_id" shows identification information (extended category information of a stream) in a high-quality format corresponding to each extended video stream. For example, "0" shows a base stream. "1 to 4" show spatially-extended streams. "5 to 8" show frame rate-extended streams. "9 to 12" show dynamic range-extended streams. "13 to 16" show color gamut-extended streams. "17 to 20" show bit length-extended streams. "21 to 24" show spatial extension and frame rate extension. "25 to 28" show frame rate extension and dynamic range extension.

For example, the basic video stream STb corresponds to a base stream, and thus "nuh_layer_id" in the header of the NAL unit which configures the basic video stream STb is set to "0". In addition, for example, the extended video stream STe1 corresponds to a frame rate-extended stream, and thus "nuh_layer_id" in the header of the NAL unit which configures the extended video stream STe1 is set to any of a range of "5 to 8".

Moreover, for example, the extended video stream STe2 corresponds to a dynamic range-extended stream, and thus "nuh_layer_id" in the header of the NAL unit which configures the extended video stream STe2 is set to any of a range of "9 to 12". Furthermore, for example, the extended video stream STe3 corresponds to a stream of frame rate extension and dynamic range extension, and thus "nuh_layer_id" in the header of the NAL unit which configures the extended video stream STe3 is set to any of a range of "25 to 28".

FIG. 6 shows a configuration example of the basic video stream STb and the extended video streams STe1, STe2, and STe3. A horizontal axis represents a display order (picture order of composition (POC)), the left side is set to be prior to a display time, and the right side is set to be after the display time. Each of rectangular frames represents a picture, and a solid line arrow represents a reference relationship of pictures in prediction encoding.

The basic video stream STb is configured by encoding image data of pictures of "00", "01", . . . . The extended video stream STe1 is configured by encoded image data of pictures of "10", "11", . . . positioned between respective pictures of the basic video stream STb. The extended video stream STe2 is configured by encoded image data of pictures of "20", "21", . . . at the same positions as respective pictures of the basic video stream STb. Then, the extended video stream STe3 is configured by encoded image data of pictures of "30", "31", . . . positioned between respective pictures of the extended video stream STe2.

Returning to FIG. 2, the system encoder 107 generates a transport stream TS including the basic video stream STb and the extended video streams STe1, STe2, and STe3 generated by the video encoder 106. Then, the transmission unit 108 places the transport stream TS on a broadcast wave or a net packet and transmits the result to the reception device 200.

At this time, the system encoder 107 inserts a high-quality format corresponding to each of the extended video streams STe1, STe2, and STe3 into a layer of the container (transport stream). In the embodiment, for example, the system encoder 107 inserts a scalable extension descriptor including identification information into a video elementary stream loop corresponding to each of the extended video streams present under the program map table (PMT).

FIG. 7 shows a structure example (Syntax) of the scalable extension descriptor. FIG. 8 shows a content (Semantics) of principle information in the structure example shown in FIG. 7. An 8-bit field of "descriptor_tag" shows a descriptor type, and herein shows a scalable extension descriptor. An 8-bit field of "descriptor_length" shows a length (size) of a descriptor, and shows the following number of bytes as the length of the descriptor.

A 4-bit field of "type of enhancement" shows identification information (extended category information of a stream) in a high-quality format corresponding to each of the extended video streams. For example, "1" represents spatial scalable extension. "2" represents frame rate scalable extension. "3" represents dynamic range scalable extension. "4" represents color gamut scalable extension. "5" represents bit length scalable extension. "6" represents spatial and frame rate scalable extension. "7" represents frame-rate and dynamic range scalable extension.

For example, the extended video stream STe1 corresponds to frame rate scalable extension, and thus "type of enhancement" of a scalable extension descriptor corresponding to the extended video stream STe1 is set to "2".

In addition, for example, the extended video stream STe2 corresponds to dynamic range scalable extension, and thus "type of enhancement" of a scalable extension descriptor corresponding to the extended video stream STe2 is set to "3".

Moreover, for example, the extended video stream STe3 corresponds to frame rate/dynamic range scalable extension, and thus "type of enhancement" of a scalable extension descriptor corresponding to the extended video stream STe3 is set to "7".

FIG. 9 shows a correspondence relationship between a value of this "type of enhancement" field and a value of "nuh_layer_id" field of the NAL unit header. In this manner, it can be understood that identification information (extended category information of a stream) in a high-quality format corresponding to each of the extended video streams, even if from any field, can be grasped similarly.

Returning to FIG. 7, a 4-bit field of "scalable_priority" shows a priority in the same extended category of each of the extended video streams. That is, the field shows whether each of the extended video streams is generated by performing the prediction encoding process between the high-quality format image data and basic format image data, respectively, or generated by performing the prediction encoding process between the high-quality format image data and high-quality format image data, respectively.

For example, "0" represents a first priority stream referencing a basic stream, that is, that each of the extended video streams is generated by performing the prediction encoding process between the high-quality format image data and basic format image data. In addition, for example, "1" represents a second priority stream referencing the first priority stream, that is, that each of the extended video streams is generated by performing the prediction encoding process between the high-quality format image data and high-quality format image data.

For example, the extended video stream STe1 is related to encoding of the high-quality format image data Vh1' and is generated by performing a prediction encoding process between the high-quality format image data Vh1' and the basic format image data Vb'. For this reason, "scalable_priority" of a scalable extension descriptor corresponding to the extended video stream STe1 is set to "0".

In addition, for example, the extended video stream STe2 is related to encoding of the high-quality format image data Vh2' and is generated by performing a prediction encoding process between the high-quality format image data Vh2' and the basic format image data Vb'. For this reason, "scalable_priority" of a scalable extension descriptor corresponding to the extended video stream STe2 is set to "0".

In addition, for example, the extended video stream STe3 is related to encoding of the high-quality format image data Vh3' and is generated by performing the prediction encoding process between the high-quality format image data Vh3' and the high-quality format image data Vh2'. For this reason, "scalable_priority" of a scalable extension descriptor corresponding to the extended video stream STe3 is set to "1".

A 32-bit field of "enhancement reference PID" shows a HD value of a reference stream. In other words, this field shows a PID value of a video stream corresponding to image data referred to in the prediction encoding process between the high-quality format image data and basic format image data or between the high-quality format image data and other high-quality format image data, which is performed when each of the extended video streams is generated, respectively.

For example, the extended video stream STe1 is related to encoding of the high-quality format image data Vh1' and is generated by performing the prediction encoding process between the high-quality format image data Vh1' and the basic format image data Vb'. For this reason, "enhancement reference PID" of a scalable extension descriptor corresponding to the extended video stream STe1 shows a PID value of the basic video stream STb.

In addition, for example, the extended video stream STe2 is related to encoding of the high-quality format image data Vh2' and is generated by performing the prediction encoding process between the high-quality format image data Vh2' and the basic format image data Vb'. For this reason, "enhancement reference PID" of a scalable extension descriptor corresponding to the extended video stream STe2 shows the PID value of the basic video stream STb.

In addition, for example, the extended video stream STe3 is related to encoding of the high-quality format image data Vh3' and is generated by performing a prediction encoding process between the high-quality format image data Vh3' and the high-quality format image data Vh2'. For this reason, "enhancement reference PID" of a scalable extension descriptor corresponding to the extended video stream STe3 shows a PID value of the extended video stream STe2.

[Configuration of Transport Stream TS]

Figure 10:
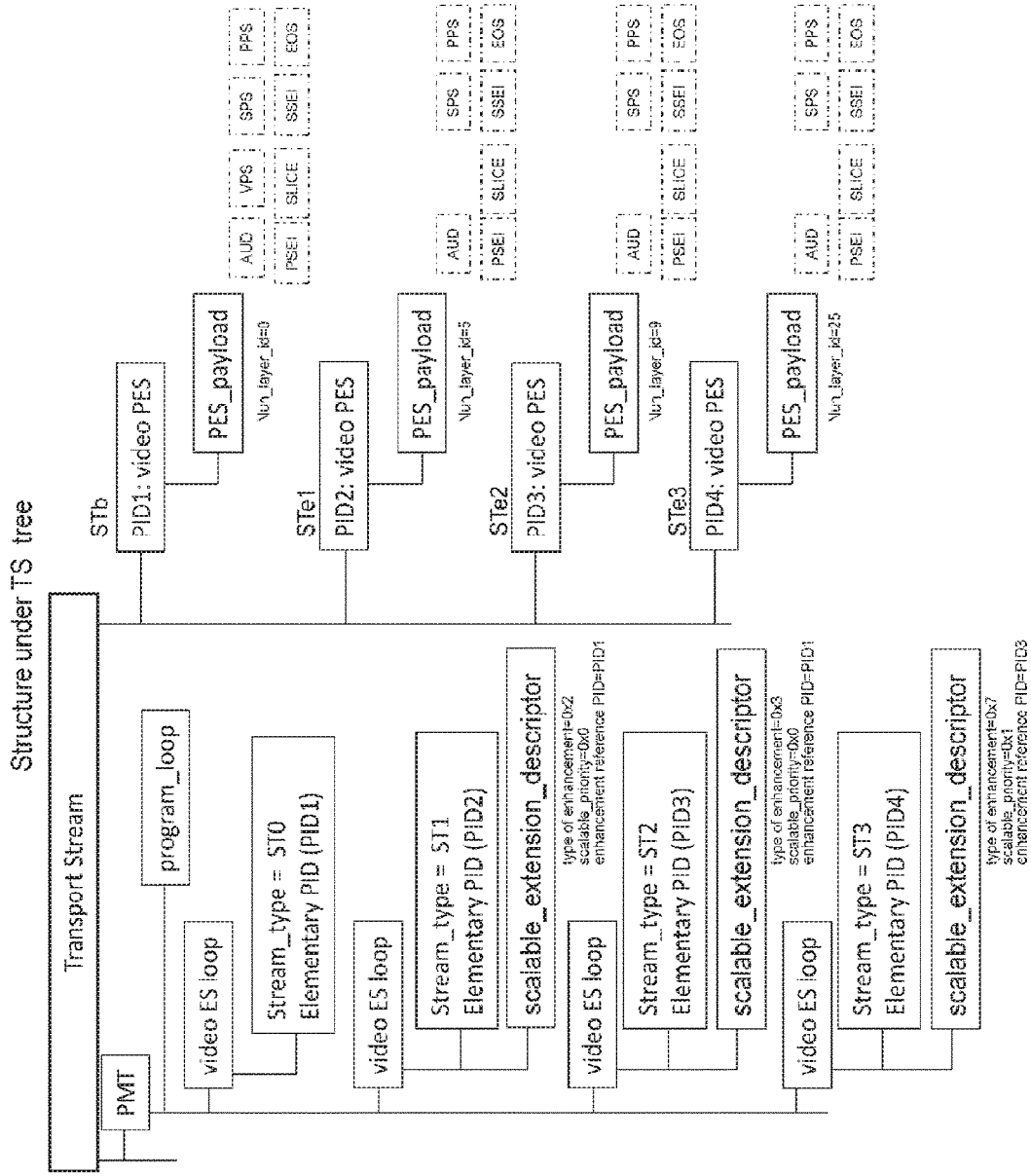
FIG. 10 is a diagram showing a configuration example of a transport stream TS.

FIG. 10 shows a configuration example of a transport stream TS. The transport stream TS includes four video streams of the basic video stream STb and the extended video streams STe1, STe2, and STe3. In the configuration example, a PES packet "video PES" of each video stream is present.

A packet identifier (PID) of the basic video stream STb is set to, for example, PID1. In encoding image data of each picture of the video stream, NAL units such as AUD, VPS, SPS, PPS, PSEI, SLICE, SSEI, and EOS are present. "nuh_layer_id" in headers of these NAL units is set to "0", which represents a basic video stream (refer to FIG. 9).

In addition, a packet identifier (PID) of the extended video stream STe1 is set to, for example, PID2. In encoding image data of each picture of the video stream, NAL units such as AUD, SPS, PPS, PSEI, SLICE, SSEI, and EOS are present. "nuh_layer_id" in headers of these NAL units is set to "5", for example, which represents a frame rate-extended stream (refer to FIG. 9).

Moreover, a packet identifier (PID) of the extended video stream STe2 is set to, for example, PID3. In encoding image data of each picture of the video stream, NAL units such as AUD, SPS, PPS, PSEI, SLICE, SSEI, and EOS are present. "nuh_layer_id" in headers of these NAL units is set to "9", which represents a dynamic range-extended stream (refer to FIG. 9).

Furthermore, a packet identifier (PM) of the extended video stream STe3 is set to, for example, PID4. In encoding image data of each picture of the video stream, NAL units such as AUD, SPS, PPS, PSEI, SLICE, SSEI, and EOS are present. "nuh_layer_id" in headers of these NAL units is set to "25", for example, which represents a frame rate-extended and dynamic range-extended stream (refer to FIG. 9).

In addition, the transport stream TS includes a program map table (PMT) as program specific information (PSI). This PSI is information describing to which program each elementary stream included in the transport stream is affiliated.

A program loop which describes information related to an entire program is present in the PMT. In addition, an elementary stream loop having information related to each elementary stream is present in the PMT. In this configuration example, four video elementary stream loops (video ES loops) corresponding to four video streams of the basic video stream STb and the extended video streams STe1, STe2, and STe3 are present. Information of a stream type (ST0), a packet identifier (PID1), and the like is disposed in a video elementary stream loop corresponding to the basic video stream STb.

In addition, information of a stream type (ST1), a packet identifier (PID2), and the like is disposed, and a descriptor which describes information related to the extended video stream STe1 is disposed in a video elementary stream loop corresponding to the extended video stream STe1. As one of the descriptors, the scalable extension descriptor described above is inserted.

"type of enhancement" in the descriptor is set to "2", which represents a frame rate-extended stream (frame rate scalable extension) (refer to FIG. 9). In addition, "scalable_priority" in the descriptor is set to "0", which represents the first priority stream referencing the basic stream. Moreover, "enhancement reference PID" in the descriptor is set to "PID1", which represents reference to the basic video stream STb.

In addition, information of a stream type (ST2), a packet identifier (PID3), and the like is disposed, and a descriptor which describes information related to the extended video stream STe2 is disposed in a video elementary stream loop corresponding to the extended video stream STe2. As one of the descriptors, the scalable extension descriptor described above is inserted.

"type of enhancement" in the descriptor is set to "3", which represents a dynamic range-extended stream (dynamic range scalable extension) (refer to FIG. 9). In addition, "scalable_priority" in the descriptor is set to "0", which represents the first priority stream referencing a basic stream. Moreover, "enhancement reference PID" in the descriptor is set to "PID1", which represents reference to the basic video stream STb.

In addition, information of a stream type (ST3), a packet identifier (PID4), and the like is disposed, and a descriptor which describes information related to the extended video stream STe3 is disposed in a video elementary stream loop corresponding to the extended video stream STe3. As one of the descriptors, the scalable extension descriptor described above is inserted.

"type of enhancement" in the descriptor is set to "7", which represents a frame rate-extended and dynamic range-extended stream (frame rate/dynamic range scalable extension) (refer to FIG. 9). In addition, "scalable_priority" in the descriptor is set to "1, which represents a second priority stream referencing the first priority stream. Moreover, "enhancement reference PID" in the descriptor is set to "PID3", which represents reference to the extended video stream STe2.

An operation of the transmission device 100 shown in FIG. 2 will be briefly described. The basic format image data Vb which is an LDR image data with a frame frequency of 50 Hz is supplied to the LDR photoelectric conversion unit 102. The LDR photoelectric conversion unit 102 applies photoelectric conversion characteristics (LDR OETF curve) for an LDR image to the basic format image data Vb, and thereby the basic format image data Vb' for transmission is obtained. The basic format image data Vb' is supplied to the encoding units 106-0, 106-1, and 106-2 of the video encoder 106.

In addition, the high-quality format image data Vh1 which is an LDR image data with a frame frequency of 100 Hz is supplied to the LDR photoelectric conversion unit 103. The LDR photoelectric conversion unit 103 applies the photoelectric conversion characteristics (LDR OETF curve) for an LDR image to the high-quality format image data Vh1, and thereby the high-quality format image data Vh1' for transmission is obtained. The high-quality format image data Vh1' is supplied to the encoding unit 106-1 of the video encoder 106.

Moreover, the high-quality format image data Vh2 which is a HDR image data with a frame frequency of 50 Hz is supplied to the HDR photoelectric conversion unit 104. The HDR photoelectric conversion unit 104 applies photoelectric conversion characteristics (HDR OETF curve) for a HDR image to the high-quality format image data Vh2, and thereby the high-quality format image data Vh2' for transmission is obtained. The high-quality format image data Vh2' is supplied to the encoding units 106-2 and 106-3 of the video encoder 106.

Furthermore, the high-quality format image data Vh3 which is a HDR image data with a frame frequency of 100 Hz is supplied to the HDR photoelectric conversion unit 105. The HDR photoelectric conversion unit 105 applies the photoelectric conversion characteristics (HDR OETF curve)

for a HDR image to the high-quality format image data Vh3, and thereby the high-quality format image data Vh3' for transmission is obtained. The high-quality format image data Vh3' is supplied to the encoding unit 106-3 of the video encoder 106.

The video encoder 106 performs an encoding process on each of the basic format image data Vb' and the high-quality format image data Vh1', Vh2', and Vh3', and thereby a video stream is generated. In other words, the encoding unit 106-0 performs a prediction encoding process such as H.264/AVC or H.265/HEVC on the basic format image data Vb' for transmission, and thereby the basic video stream STb including encoding image data of each picture is generated. In this case, prediction in the image data Vb' is performed by the encoding unit 106-0.

In addition, the encoding unit 106-1 performs the prediction encoding process such as H.264/AVC or H.265/HEVC on the high-quality format image data Vh1' for transmission, and thereby the extended video stream STe1 including encoding image data of each picture is generated. In this case, the encoding unit 106-1 selectively performs prediction in the image data Vh1' or prediction between the high-quality format image data Vh1' and the image data Vb' for each encoding block to reduce a prediction residue.

Moreover, the encoding unit 106-2 performs the prediction encoding process such as H.264/AVC or H.265/HEVC on the high-quality format image data Vh2' for transmission, and thereby the extended video stream STe2 including encoding image data of each picture is generated. In this case, the encoding unit 106-2 selectively performs prediction in the image data Vh2' or prediction between the image data Vh2' and the image data Vb' for each encoding block to reduce the prediction residue.

Furthermore, the encoding unit 106-3 performs the prediction encoding process such as H.264/AVC or H.265/HEVC on the high-quality format image data Vh3' for transmission, and thereby the extended video stream STe3 including encoding image data of each picture is generated. In this case, the encoding unit 106-3 selectively performs prediction in the image data Vh3' or the prediction between the image data Vh3' and the image data Vh2' for each encoding block to reduce the prediction residue.

In addition, the video encoder 106 inserts identification information in each corresponding high-quality format into layers of the extended video streams STe1, STe2, and STe3, respectively. That is, the video encoder 106 sets identification information (extended category information of a stream) in a high-quality format corresponding to each of the extended video streams in a field of "nuh_layer_id" in the header of the NAL unit (refer to FIGS. 5 and 9).

The basic video stream STb and the extended video streams STe1, STe2, and STe which are generated by the video encoder 106 are supplied to the system encoder 107. The system encoder 107 generates a transport stream TS including each video stream.

The system encoder 107 inserts identification information in a high-quality format corresponding to each of the extended video streams STe1, STe2, and STe3 into the layer of the container (transport stream). In other words, the system encoder 107 inserts a scalable extension descriptor including identification information (extended category information of a stream) into a video elementary stream loop corresponding to each of the extended video streams present under the PMT (refer to FIGS. 7 and 9).

The transport stream TS generated by the system encoder 107 is transmitted to the transmission unit 108. The transmission unit 108 places the transport stream TS on a broadcast wave or a net packet and transmits the result to the reception device 200.

[Configuration of Reception Device]

Figure 11:
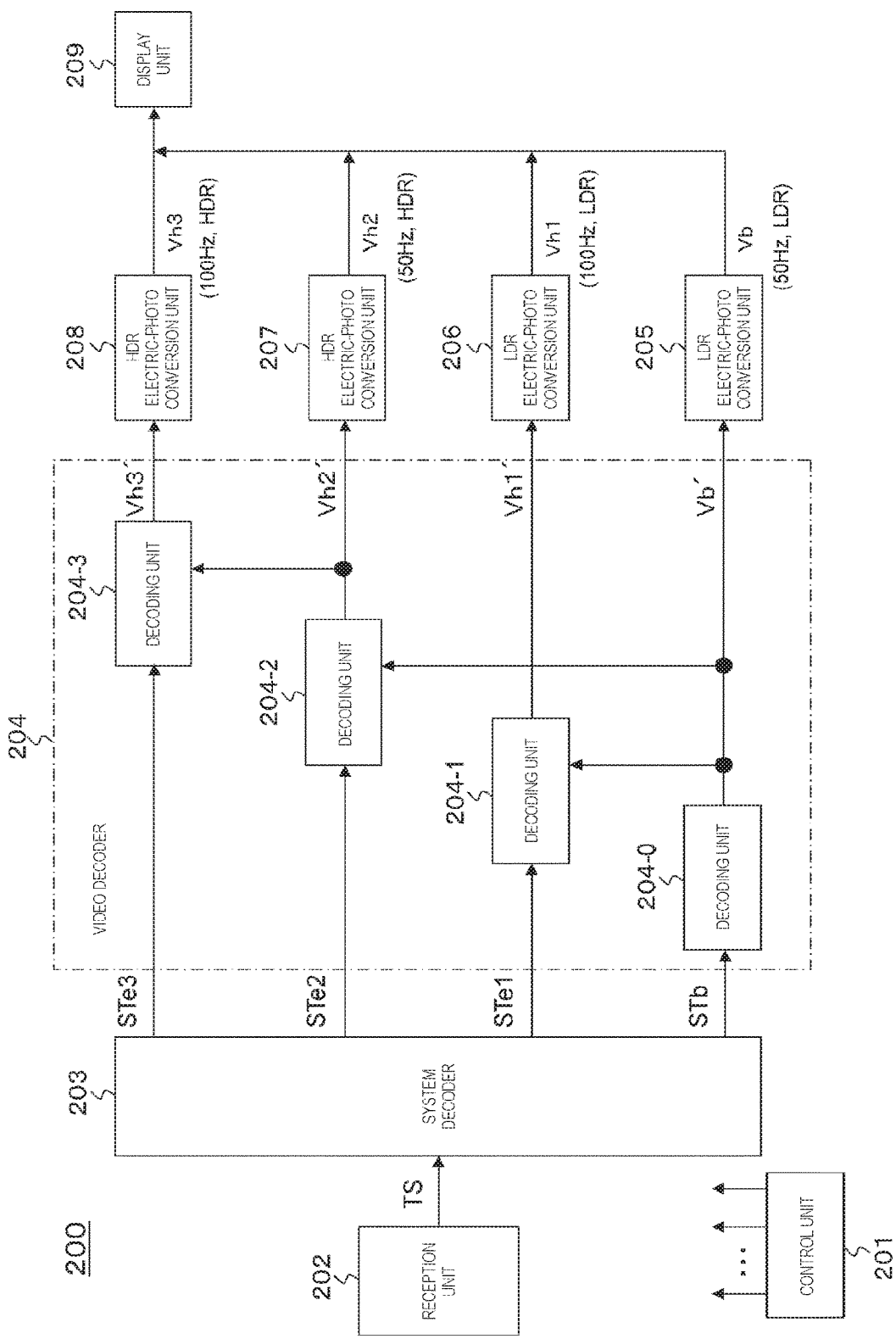
FIG. 11 is a diagram showing a configuration example of a reception device.

FIG. 11 shows a configuration example of the reception device 200. The reception device 200 corresponds to a configuration example of the transmission device 100 of FIG. 2. The reception device 200 includes a control unit 201, a reception unit 202, a system decoder 203, a video decoder 204, LDR electric-photo conversion units 205 and 206L, HDR electric-photo conversion units 207 and 208, and a display unit (display device) 209. The control unit 201 is configured to include a central processing unit (CPU), and controls operations of each unit of the reception device 200 based on a control program stored in a storage not shown.

The reception unit 202 receives the transport stream TS placed on a broadcast wave or a net packet and transmitted from the transmission device 100. The system decoder 203 extracts the basic video stream STb and the extended video streams STe1, STe2, and STe3 from the transport stream TS.

In addition, the system decoder 203 extracts various types of information inserted into the layer of the container (transport stream) and transmits the information to the control unit 201. The information also includes the scalable extension descriptor described above. The control unit 201 can grasp identification information (extended category information of a stream) in a high-quality format corresponding to each of the extended video streams STe1, STe2, and STe3 from a field of "type of enhancement" of the descriptor.

Moreover, the control unit 201 can grasp a priority in the same extended category in each of the extended video streams STe1, STe3, and STe3, that is, whether the first priority stream referencing the basic stream or the second priority stream referencing the first priority stream, from a field of "scalable_priority" of the descriptor. Furthermore, the control unit 201 can grasp a PID value of a video stream referred to by each of the extended video streams STe1, STe2, and STe3 from a field of "enhancement reference PID" of the descriptor.

The video decoder 204 includes four decoding units 204-0, 204-1, 204-2, and 204-3. The decoding unit 204-0 performs a decoding process on the basic video stream STb and generates the basic format image data Vb'. In this case, the decoding unit 204-0 performs prediction compensation within the image data Vb'.

The decoding unit 204-1 performs a decoding process on the extended video stream STe1 and generates the high-quality format image data Vh1'. In this case, the decoding unit 204-1 performs prediction compensation in the image data Vh1' or prediction compensation between the image data Vh1' and the image data Vb' for each encoding block in accordance with prediction at a time of encoding.

The decoding unit 204-2 performs a decoding process on the extended video stream STe2 and generates the high-quality format image data Vh2'. In this case, the decoding unit 204-2 performs prediction compensation in the image data Vh2' or prediction compensation between the image data Vh2' and the image data Vb' for each encoding block in accordance with prediction at a time of encoding.

The decoding unit 204-3 performs a decoding process on the extended video stream STe3 and generates the high-quality format image data Vh3'. In this case, the decoding unit 204-3 performs prediction compensation in the image data Vh3' or the prediction compensation between the image data Vh3' and the image data Vh2' for each encoding block in accordance with prediction at a time of encoding.

Figure 12:
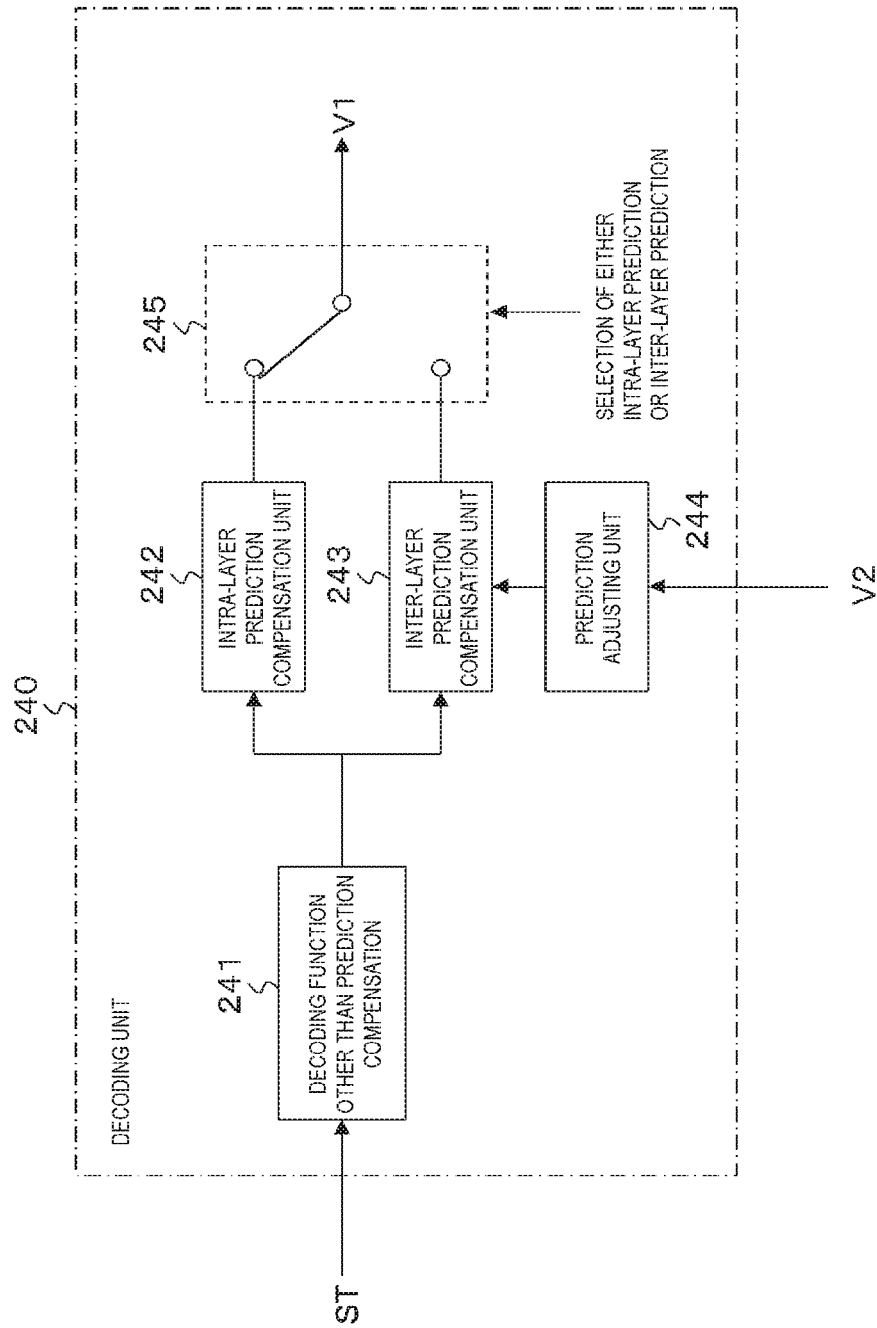
FIG. 12 is a block diagram showing a configuration example of a main portion of a decoding unit.

FIG. 12 shows a configuration example of a main portion of the decoding unit 240. The decoding unit 240 can be applied to the decoding units 204-1, 204-2, and 204-3. The decoding unit 240 performs a process reverse to a process of the encoding unit 165 of FIG. 4. The decoding unit 240 includes a decoding function unit 241, an intra-layer prediction compensation unit 242, an inter-layer prediction compensation unit 243, a prediction adjusting unit 244, and a selection unit 245.

The decoding function unit 241 performs a decoding process other than the prediction compensation on the video stream ST and obtains prediction residual data. The intra-layer prediction compensation unit 242 performs prediction compensation (intra-layer prediction compensation) in the image data V1 on the prediction residual data and obtains the image data V1. The inter-layer prediction compensation unit 243 performs prediction compensation (inter-layer prediction compensation) between the image data V1 and the image data V2 to be referred to on the prediction residual data and obtains the image data V1.

The prediction adjusting unit 244, even if detailed description is omitted, performs a process according to a type of scalable extension of the image data V1 to the image data V2 in the same manner as the prediction adjusting unit 163 of the encoding unit 160 of FIG. 4. The selection unit 245 selectively takes out and outputs either an image data V1 obtained by the intra-layer prediction compensation unit 242 or an image data V1 obtained by the inter-layer prediction compensation unit 243 for each encoding block, corresponding to prediction at a time of encoding.

Returning to FIG. 11, the video decoder 204 transmits header information of an NAL unit of each video stream to the control unit 201. The control unit 201 can grasp identification information (extended category information of a stream) in a high-quality format corresponding to each of the extended video streams STe1, STe2, and STe3 from a field of "nuh_layer_id" of the header information.

The LDR electric-photo conversion unit 205 performs electric-photo conversion of characteristics, reverse to the conversion characteristics of the LDR photoelectric conversion unit 102 in the transmission device 100 described above, on the basic format image data Vb' obtained by the decoding unit 204-0, and obtains the basic format image data Vb. The basic format image data is an LDR image data whose frame frequency is 50 Hz.

In addition, the LDR electric-photo conversion unit 206 performs electric-photo conversion of characteristics, reverse to the conversion characteristics of the LDR photoelectric conversion unit 103 in the transmission device 100 described above, on the high-quality format image data Vh1' obtained by the decoding unit 204-1, and obtains the high-quality format image data Vh1. The high-quality format image data Vh1 is an LDR image data whose frame frequency is 100 Hz.

Moreover, the HDR electric-photo conversion unit 207 performs electric-photo conversion of characteristics, reverse to the conversion characteristics of the HDR photoelectric conversion unit 104 in the transmission device 100 described above, on the high-quality format image data Vh2' obtained by the decoding unit 204-2, and obtains the high-quality format image data Vh2. The high-quality format image data Vh2 is a HDR image data whose frame frequency is 50 Hz.

Furthermore, the HDR electric-photo conversion unit 208 performs electric-photo conversion of characteristics, reverse to the conversion characteristics of the HDR photoelectric conversion unit 105 in the transmission device 100 described above, on the high-quality format image data Vh3' obtained by the decoding unit 204-3, and obtains the high-quality format image data Vh3. The high-quality format image data Vh3 is a HDR image data whose frame frequency is 100 Hz.

The display unit 209 is configured by, for example, a liquid crystal display (LCD), an organic electro-luminescence (EL) panel, and the like. The display unit 209 displays an image caused by any of the basic format image data Vb and the high-quality format image data Vh1, Vh2, and Vh3 according to display capability.

In this case, the control unit 201 controls image data such that it is supplied to the display unit 209. The control is performed based on identification information (extended category information of a stream) in a high-quality format corresponding to each of the extended video streams STe1, STe2, and STe3 grasped by the control unit 201 as described above and display capability information of the display unit 209.

That is, when the display unit 209 cannot perform either a display of a high frame frequency or a display of a high dynamic range, the control is performed so that the basic format image data Vb according to decoding of the basic video stream STb is supplied to the display unit 209. In this case, the control unit 201 controls so that the decoding unit 204-0 decodes the basic video stream STb and the LDR electric-photo conversion unit 205 outputs the basic format image data Vb.

In addition, when the display unit 209 can perform the display of a high frame frequency but cannot perform the display of a high dynamic range, the control is performed so that the high-quality format image data Vh1 according to decoding of the extended video stream STe1 is supplied to the display unit 209. In this case, the control unit 201 controls so that the decoding unit 204-0 decodes the basic video stream STb, the decoding unit 204-1 decodes the extended video stream STe1, and the LDR electric-photo conversion unit 206 outputs the high-quality format image data Vh1.

In addition, when the display unit 209 cannot perform the display of a high frame frequency but can perform the display of a high dynamic range, the control is performed so that the high-quality format image data Vh2 according to decoding of the extended video stream STe2 is supplied to the display unit 209. In this case, the control unit 201 controls so that the decoding unit 204-0 decodes the basic video stream STb, the decoding unit 204-2 decodes the extended video stream STe2, and the HDR electric-photo conversion unit 207 outputs the high-quality format image data Vh2.

In addition, when the display unit 209 can perform both the display of a high frame frequency and the display of a high dynamic range, the control is performed so that the high-quality format image data Vh3 according to decoding of the extended video stream STe3 is supplied to the display unit 209. In this case, the control unit 201 controls so that the decoding unit 204-0 decodes the basic video stream STb, the decoding unit 204-2 decodes the extended video stream STe2, the decoding unit 204-3 decodes the extended video stream STe3, and the HDR electric-photo conversion unit 208 outputs the high-quality format image data Vh3.

Operations of the reception device 200 shown in FIG. 11 will be briefly described. The reception unit 202 receives a transport stream TS placed on a broadcast wave or a net packet and transmitted from the transmission device 100. The transport stream TS is supplied to the system decoder 203. The system decoder 203 extracts the basic video stream STb and the extended video streams STe1, STe2, and STe3 from the transport stream TS.

In addition, the system decoder 203 extracts various types of information inserted into the layer of the container (transport stream) and transmits the information to the control unit 201. The information also includes a scalable extension descriptor. The control unit 201 grasps identification information (extended category information of a stream) in a high-quality format corresponding to each of the extended video streams STe1, STe2, and STe3 from a field of "type of enhancement" of the descriptor.

When the display unit 209 cannot perform either the display of a high frame frequency or the display of a high dynamic range, the basic format image data Vb is supplied to the display unit 209 from the LDR electric-photo conversion unit 205. An image according to the basic format image data Vb, that is, an LDR image data whose frame frequency is 50 Hz, is displayed on the display unit 209.

In this case, the basic video stream STb extracted by the system decoder 203 is supplied to the decoding unit 204-0. The decoding unit 204-0 performs a decoding process on the basic video stream STb, and thereby the basic format image data Vb' is generated. Here, the decoding unit 204-0 can confirm that a supply video stream is the basic video stream STb from a field of "nuh_layer_id" of the header of the NAL unit.

The basic format image data Vb' generated by the decoding unit 204-0 is supplied to the LDR electric-photo conversion unit 205. The LDR electric-photo conversion unit 205 obtains the basic format image data Vb by performing electric-photo conversion on the basic format image data Vb' and the basic format image data Vb is supplied to the display unit 209.

In addition, when the display unit 209 can perform the display of a high frame frequency but cannot perform the display of a high dynamic range, the high-quality format image data Vh1 is supplied to the display unit 209 from the LDR electric-photo conversion unit 206. An image according to the high-quality format image data Vh1, that is, an LDR image data whose frame frequency is 100 Hz, is displayed on the display unit 209.

In this case, the basic video stream STb extracted by the system decoder 203 is supplied to the decoding unit 204-0. The decoding unit 204-0 performs a decoding process on the basic video stream STb, and thereby the basic format image data Vb' is generated. In addition, the extended video stream STe1 extracted by the system decoder 203 is supplied to the decoding unit 204-1. The decoding unit 204-1 performs a decoding process on the extended video stream STe1 referencing the basic format image data Vb', and thereby the high-quality format image data Vh1' is generated.

Here, the decoding unit 204-0 can confirm that a supply video stream is the basic video stream STb from the field of "nuh_layer_id" of the header of the NAL unit. In addition, the decoding unit 204-1 can confirm that a supply video stream is the extended video stream STe1 from the field of "nuh_layer_id" of the header of the NAL unit.

The high-quality format image data Vh1' generated by the decoding unit 204-1 is supplied to the LDR electric-photo conversion unit 206. The LDR electric-photo conversion unit 206 obtains the high-quality format image data Vh1 by performing electric-photo conversion on the high-quality format image data Vh1' and the high-quality format image data Vh1 is supplied to the display unit 209.

In addition, when the display unit 209 cannot perform the display of a high frame frequency but can perform the display of a high dynamic range, the high-quality format image data Vh2 is supplied to the display unit 209 from the HDR electric-photo conversion unit 207. An image according to the high-quality format image data Vh2, that is, a HDR image data whose frame frequency is 50 Hz, is displayed on the display unit 209.

In this case, the basic video stream STb extracted by the system decoder 203 is supplied to the decoding unit 204-0. The decoding unit 204-0 performs a decoding process on the basic video stream STb, and thereby the basic format image data Vb' is generated. In addition, the extended video stream STe2 extracted by the system decoder 203 is supplied to the decoding unit 204-2. The decoding unit 204-2 performs a decoding process on the extended video stream STe2 referring to the basic format image data Vb', and thereby the high-quality format image data Vh2' is generated.

Here, the decoding unit 204-0 can confirm that a supply video stream is the basic video stream STb from the field of "nuh_layer_id" of the header of the NAL unit. In addition, the decoding unit 204-2 can confirm that a supply video stream is the extended video stream STe1 from the field of "nuh_layer_id" of the header of the NAL unit.

The high-quality format image data Vh2' generated by the decoding unit 204-2 is supplied to the HDR electric-photo conversion unit 207. The HDR electric-photo conversion unit 207 obtains the high-quality format image data Vh2 by performing electric-photo conversion on the high-quality format image data Vh2' and the high-quality format image data Vh2 is supplied to the display unit 209.

In addition, when the display unit 209 can perform both the display of a high frame frequency and the display of a high dynamic range, the high-quality format image data Vh3 is supplied to the display unit 209 from the HDR electric-photo conversion unit 208. An image according to the high-quality format image data Vh3, that is, a HDR image data whose frame frequency is 100 Hz, is displayed on the display unit 209.

In this case, the basic video stream STb extracted by the system decoder 203 is supplied to the decoding unit 204-0. The decoding unit 204-0 performs a decoding process on the basic video stream STb, and thereby the basic format image data Vb' is generated. In addition, the extended video stream STe2 extracted by the system decoder 203 is supplied to the decoding unit 204-2. The decoding unit 204-2 performs a decoding process on the extended video stream STe2 referencing the basic format image data Vb', and thereby the high-quality format image data Vh2' is generated.

Furthermore, the extended video stream STe3 extracted by the system decoder 203 is supplied to the decoding unit 204-3. The decoding unit 204-3 performs a decoding process on the extended video stream STe3 referencing the high-quality format image data Vh2', and thereby the high-quality format image data Vh3' is generated.

Here, the decoding unit 204-0 can confirm that a supply video stream is the basic video stream STb from the field of "nuh_layer_id" of the header of the NAL unit. In addition, the decoding unit 204-2 can confirm that a supply video stream is the extended video stream STe1 from the field of "nuh_layer_id" of the header of the NAL unit. Moreover, the decoding unit 204-3 can confirm that a supply video stream is the extended video stream STe3 from the field of "nuh_layer_id" of the header of the NAL unit.

The high-quality format image data Vh3' generated by the decoding unit 204-3 is supplied to the HDR electric-photo conversion unit 208. The HDR electric-photo conversion unit 208 obtains the high-quality format image data Vh3 by performing electric-photo conversion on the high-quality format image data Vh3' and the high-quality format image data Vh3 is supplied to the display unit 209.

As described above, in the transmission and reception system 10 shown in FIG. 1, identification information (extended category information of a stream) in a high-quality format corresponding to each of the predetermined number of extended video streams included in the transport stream TS is inserted into the layer of the container or the video stream and transmitted by the transmission device 100. For this reason, it is easy to obtain image data in accordance with display capability on a receiving side by selectively performing a decoding process on a predetermined video stream based on the identification information.

2. Modification Example

In the embodiment described above, an example is shown in which identification information (extended category information of a stream) in a high-quality format corresponding to each of the predetermined number of extended video streams included in the transport stream TS is inserted into the layer of both the container and the video stream and transmitted. However, the identification information being inserted into the layer of the container only or the layer of the video stream only may also be considered.

Moreover, instead of transmitting information which indicates an ID representing a layer extension type of a stream, an extended category of a stream, and a priority in the extended category, it is possible to indicate a combination state of these using a value of "stream type". For example, as shown in FIG. 10, a basic stream can be set as "Stream type=ST0", a first stream of frame rate scalable extended stream can be set as "Stream type=ST1", a first stream of dynamic range scalable extended stream can be set as "Stream type=ST2", and a frame rate/dynamic range scalable extended stream (second extended stream) can be set as "Stream type=ST3".

It should be noted that, although the above-described embodiment shows the transmission and reception system 10 constituted by the transmission device 100 and the reception device 200, a configuration of a transmission and reception system to which the present technology can be applied is not limited thereto. For example, the reception device 200 part may be configured with, for example, a set-top box connected with a digital interface such as High-Definition Multimedia Interface (HDMI) and a monitor, or the like. In this case, the set-top box can obtain display capability information by acquiring extended display identification data (EDID) from a monitor, and the like. "HDMI" is a registered trademark.

In addition, the above-described embodiment shows the example in which the container is a transport stream (MPEG-2 TS). The present technology, however, can also be similarly applied to a system configured to distribute data to a reception terminal using a network such as the Internet. In distribution on the Internet, there are many cases of distribution using a container in MP4 or other formats. In other words, as containers, various formats including transport streams (MPEG-2 TS) employed in digital broadcasting standards, MP4 used in Internet distribution, and the like are equivalent thereto.

Additionally, the present technology may also be configured as below.

(1)

A transmission device including:

an image encoding unit which generates a basic video stream obtained by encoding basic format image data and a predetermined number of extended video streams obtained by encoding the predetermined number of pieces of high-quality format image data;

a transmission unit which transmits a container in a predetermined format including the basic video stream and the predetermined number of extended video streams generated by the image encoding unit; and an identification information insertion unit which inserts identification information in a high-quality format corresponding to each of the predetermined number of extended video streams into a layer of the container.

(2)

The transmission device according to (1), wherein the image encoding unit generates, with respect to the basic format image data, the basic video stream by performing a prediction encoding process in the basic format image data, and generates, with respect to the high-quality format image data, the extended video stream by selectively performing a prediction encoding process in the high-quality format image data or a prediction encoding process between the high-quality format image data and the basic format image data or between the high-quality format image data and other high-quality format image data.

(3)

The transmission device according to (2), wherein the identification information inserted into a layer of the container includes information indicating whether each of the predetermined number of extended video streams is generated by performing a prediction encoding process between the high-quality format image data and the basic format image data or by performing a prediction encoding process between the high-quality format image data and the high-quality format image data.

(4)

The transmission device according to (2) or (3), wherein the identification information inserted into a layer of the container includes information indicating a video stream corresponding to image data referred to in a prediction encoding process between the high-quality format image data and the basic format image data or between the high-quality format image data and other high-quality format image data performed when each of the predetermined number of extended video streams is generated.

(5)

The transmission device according to any of (1) to (4), wherein the container is an MPEG2-TS, and the identification information insertion unit inserts the identification information into respective video elementary stream loops corresponding to the predetermined number of extended video streams present under a program map table.

(6)

The transmission device according to any of (1) to (5), wherein the identification information insertion unit further inserts identification information in a high-quality format corresponding to each of the predetermined number of extended video streams into a layer of the video stream.

(7)

The transmission device according to (6), wherein the video stream has a structure of a NAL unit, and the identification information insertion unit inserts the identification information into a header of the NAL unit.

(8)

A transmission method including:

an image encoding step of generating a basic video stream obtained by encoding basic format image data and a predetermined number of extended video streams obtained by encoding the predetermined number of pieces of high-quality format image data;

a transmission step of transmitting, by a transmission unit, a container in a predetermined format including the basic video stream and the predetermined number of extended video streams generated in the image encoding step; and an identification information insertion step of inserting identification information in a high-quality format corresponding to each of the predetermined number of extended video streams into a layer of the container.

(9)

A transmission device including:

an image encoding unit which generates a basic video stream obtained by encoding basic format image data and a predetermined number of extended video streams obtained by encoding the predetermined number of pieces of high-quality format image data;

a transmission unit which transmits a container in a predetermined format including the basic video stream and the predetermined number of extended video streams generated by the image encoding unit; and an identification information insertion unit which inserts identification information in a high-quality format corresponding to each of the predetermined number of extended video streams into a layer of the video stream.

(10)

The transmission device according to (9), wherein the image encoding unit generates, with respect to the basic format image data, the basic video stream by performing a prediction encoding process in the basic format image data, and generates, with respect to the high-quality format image data, the extended video stream by selectively performing a prediction encoding process in the high-quality format image data or a prediction encoding process between the high-quality form at image data and the basic form at image data or between the high-quality format image data and other high-quality format image data.

(11)

The transmission device according to (9) or (10), wherein the video stream has a structure of a NAL unit, and the identification information insertion unit inserts the identification information into a header of the NAL unit.

(12)

A transmission method including:

an image encoding step of generating a basic video stream obtained by encoding basic format image data and a predetermined number of extended video streams obtained by encoding the predetermined number of pieces of high-quality format image data;

a transmission step of transmitting, by a transmission unit, a container in a predetermined format including the basic video stream and the predetermined number of extended video streams generated in the image encoding step; and an identification information insertion step of inserting identification information in a high-quality format corresponding to each of the predetermined number of extended video streams into a layer of the video stream.

(13)

A reception device including:

a reception unit which receives a container in a predetermined format including a basic video stream obtained by encoding basic format image data and a predetermined number of extended video streams obtained by encoding the predetermined number of pieces of high-quality format image data, wherein identification information in a high-quality format corresponding to each of the predetermined number of extended video streams is inserted into a layer of the container, and the reception device further includes a process unit which processes each of the video streams included in the received container based on the identification information.

(14)

The reception device according to (13), wherein the process unit acquires image data in accordance with display capability by performing a decoding process on the basic video stream and a predetermined one of the extended video streams based on the identification information and display capability information.

(15)

The reception device according to (13) or (14), wherein the basic video stream is generated by performing, with respect to the basic format image data, a prediction encoding process in the basic format image data, and the extended video stream is generated by selectively performing, with respect to the high-quality format image data, a prediction encoding process in the high-quality format image data or a prediction encoding process between the high-quality format image data and the basic format image data or between the high-quality format image data and other high-quality format image data.

(16)

A reception method including:

a reception step of receiving, by a reception unit, a container in a predetermined format which includes a basic video stream obtained by encoding basic format image data and a predetermined number of extended video streams obtained by encoding the predetermined number of pieces of high-quality format image data, wherein identification information in a high-quality format corresponding to each of the predetermined number of extended video streams is inserted into a layer of the container, and the reception method further includes a process step of processing each of the video streams included in the received container based on the identification information.

(17)

A reception device including:

a reception unit which receives a container in a predetermined format including a basic video stream obtained by encoding basic format image data and a predetermined number of extended video streams obtained by encoding the predetermined number of pieces of high-quality format image data, wherein identification information in a high-quality format corresponding to each of the predetermined number of extended video streams is inserted into a layer of the video stream, and the reception device further includes a process unit which processes each of the video streams included in the received container based on the identification information.

(18)

The reception device according to (17), wherein the process unit acquires image data in accordance with display capability by performing a decoding process on the basic video stream and a predetermined one of the extended video streams based on the identification information and display capability information.

(19)

The reception device according to (17) or (18),
wherein the basic video stream is generated by performing, with respect to the basic format image data, a prediction encoding process in the basic format image data, and the extended video stream is generated by selectively performing, with respect to the high-quality format image data, a prediction encoding process in the high-quality format image data or a prediction encoding process between the high-quality format image data and the basic format image data or between the high-quality format image data and other high-quality format image data.

(20)

A reception method including:
a reception step of receiving, by a reception unit, a container in a predetermined format which includes a basic video stream obtained by encoding basic format image data and a predetermined number of extended video streams obtained by encoding the predetermined number of pieces of high-quality format image data, wherein identification information in a high-quality format corresponding to each of the predetermined number of extended video streams is inserted into a layer of the video stream, and the reception method further includes a process step of processing each of the video streams included in the received container based on the identification information.

A main feature of the present technology is that it is easy to obtain image data in accordance with display capability on a receiving side by inserting and transmitting identification information (extended category information of a stream) in a high-quality format corresponding to each of the predetermined number of extended video streams included in the transport stream TS into a layer of the container or the video stream (refer to FIG. 10).

REFERENCE SIGNS LIST 10 transmission and reception system
100 transmission device
101 control unit
102, 103 LDR photoelectric conversion unit
104, 105 HDR photoelectric conversion unit
106 video encoder
106-0, 106-1, 106-1, 106-1 encoding unit
107 system encoder
108 transmission unit
150 image data generation unit
151 HDR camera
152, 154 frame rate conversion unit
153 dynamic range conversion unit
160 encoding unit
161 intra-layer prediction unit
162 inter-layer prediction unit
163 prediction adjusting unit
164 selection unit
165 encoding function unit
200 reception device
201 control unit
202 reception unit
203 system decoder
204 video decoder
204-0, 204-1, 204-1, 204-1 decoding unit
205, 206 LDR electric-photo conversion unit
207, 208 HDR electric-photo conversion unit
209 display unit
240 decoding unit
241 decoding function unit
242 intra-layer prediction compensation unit
243 inter-layer prediction compensation unit
244 prediction adjusting unit
245 selection unit

The invention claimed is:

1. A transmission device, comprising:
processing circuitry configured to
generate a basic video stream obtained by performing a prediction encoding process on basic format image data and generate a number of extended video streams obtained by encoding a number of pieces of high-quality format image data,
transmit a container including the basic video stream and the number of generated extended video streams, and
insert identification information in a high-quality format corresponding to each of the number of extended video streams into a layer of the container or a layer of the respective extended video stream, wherein
the identification information includes, for each of the number of extended video streams, (i) first information that indicates a type of extended category for the respective extended video stream, and (ii) second information that includes a first value when the respective extended video stream is generated by a prediction encoding process between the high-quality format image data and the basic format image data and a second value when the respective extended video stream is generated by a prediction encoding process between the high-quality format image data and other high-quality format image data.

2. The transmission device according to claim 1, wherein the processing circuitry is further configured to
generate, based on the identification information, each of the number of extended video streams by selectively performing the prediction encoding process between the high-quality format image data and the basic format image data or between the high-quality format image data and the other high-quality format image data.

3. The transmission device according to claim 1, wherein the container is an MPEG2-TS, and
the processing circuitry is further configured to insert the identification information into respective video elementary stream loops corresponding to the number of extended video streams present under a program map table.

4. The transmission device according to claim 1, wherein the video stream has a structure of a network abstraction layer (NAL) unit, and
the processing circuitry is further configured to insert the identification information into a header of the NAL unit.

5. A transmission method, comprising:
generating, via processing circuitry, a basic video stream obtained by performing a prediction encoding process on basic format image data and generating a number of extended video streams obtained by encoding a number of pieces of high-quality format image data;
transmitting, via the processing circuitry, a container including the basic video stream and the number of generated extended video streams; and
inserting identification information in a high-quality format corresponding to each of the number of extended video streams into a layer of the container or a layer of the respective extended video stream, wherein the identification information includes, for each of the number of extended video streams, (i) first information that indicates a type of extended category for the respective extended video stream, and (ii) second information that includes a first value when the respective extended video stream is generated by a prediction encoding process between the high-quality format image data and the basic format image data and a second value when the respective extended video stream is generated by a prediction encoding process between the high-quality format image data and other high-quality format image data.

6. The method according to claim 5,
wherein the video stream has a structure of a NAL unit, and
the method further including inserting the identification information into a header of the NAL unit.

7. A reception device, comprising:
processing circuitry configured to receive a container in a format including a basic video stream obtained by performing a prediction encoding process on basic format image data and including a number of extended video streams obtained by encoding a number of pieces of high-quality format image data, wherein
identification information in a high-quality format corresponding to each of the number of extended video streams is inserted into a layer of the container or a layer of the respective extended video stream,
the identification information includes, for each of the number of extended video streams, (i) first information that indicates a type of extended category for the respective extended video stream, and (ii) second information that includes a first value when the respective extended video stream is generated by a prediction encoding process between the high-quality format image data and the basic format image data and a second value when the respective extended video stream is generated by a prediction encoding process between the high-quality format image data and other high-quality format image data, and
the processing circuitry is configured to process each of the number of extended video streams included in the received container based on the identification information.

8. The reception device according to claim 7, wherein the processing circuitry is configured to acquire image data in accordance with display capability by performing a decoding process on the basic video stream and one of the number of extended video streams based on the identification information and display capability information.

9. The reception device according to claim 7, wherein an extended video stream of the number of extended video streams is generated by selectively performing, based on the identification information, the prediction encoding process between the high-quality format image data and the basic format image data or (ii) between the high-quality format image data and the other high-quality format image data.

10. A reception method, comprising:
receiving, via processing circuitry, a container in a format which includes a basic video stream obtained by performing a prediction encoding process on basic format image data and includes a number of extended video streams obtained by encoding a number of pieces of high-quality format image data, wherein
identification information in a high-quality format corresponding to each of the number of extended video streams is inserted into a layer of the container or a layer of the respective extended video stream; and
the identification information includes, for each of the number of extended video streams, (i) first information that indicates a type of extended category for the respective extended video stream, and (ii) second information that includes a first value when the respective extended video stream is generated by a prediction encoding process between the high-quality format image data and the basic format image data and a second value when the respective extended video stream is generated by a prediction encoding process between the high-quality format image data and other high-quality format image data, and the method further comprises:
processing, via the processing circuitry, each of the number of extended video streams included in the received container based on the identification information.

11. The reception method according to claim 10, further comprising:
acquiring image data in accordance with display capability by performing a decoding process on the basic video stream and one of the extended video streams based on the identification information and display capability information.

12. The reception method according to claim 10, wherein an extended video stream of the number of extended video streams is generated by selectively performing, based on the identification information, the prediction encoding process between the high-quality format image data and the basic format image data or (ii) between the high-quality format image data and the other high-quality format image data.

* * * * *